United States Patent [19]

Lucas

[11] 4,329,856
[45] May 18, 1982

[54] DEVICE FOR COUPLING IN ELASTIC FASHION TWO ROTATING COAXIAL PIECES, RESPECTIVELY INTERIOR AND EXTERIOR, HAVING A CYLINDRICAL INTERFACE

[75] Inventor: Robert C. Lucas, Paris, France

[73] Assignee: Etablissements Georges Lucas, Neuville-Saint-Remy, France

[21] Appl. No.: 89,222

[22] Filed: Oct. 29, 1979

[30] Foreign Application Priority Data

Nov. 2, 1978 [FR] France ................................ 78 31022
Mar. 16, 1979 [FR] France ................................ 79 06727

[51] Int. Cl.³ .............................................. F16D 3/56
[52] U.S. Cl. .................................................. 464/82
[58] Field of Search ............... 64/9 R, 14, 11 F, 27 R, 64/27 B

[56] References Cited

U.S. PATENT DOCUMENTS 1,460,001 6/1923 Twogood ................................ 64/14
1,460,869 7/1923 Thropp ................................... 64/14
1,878,730 9/1932 Sykes ..................................... 64/14
2,728,208 12/1955 Ehmann .............................. 64/11 F
3,434,303 3/1969 Leyer ..................................... 64/14

FOREIGN PATENT DOCUMENTS 585333 12/1977 U.S.S.R. ............................. 64/11 F
626271 8/1978 U.S.S.R. ............................. 64/11 F

Primary Examiner—Ira S. Lazarus
Attorney, Agent, or Firm—Dressler, Goldsmith, Shore, Sutker & Milnamow, Ltd.

[57] ABSTRACT

A device for interlocking in elastic fashion two coaxial rotating pieces, respectively interior and exterior, having a cylindrical interface, comprises split pins which are introduced into seatings formed parallel to the rotation axis at the interface of the two pieces. The pins are hollow steel cylinders split in the longitudinal direction, each pin being free to rotate in its seating and containing a cylindrical shank threaded in the pin with a predetermined clearance to impose a limit value chosen having regard to the reduction of the width of the split of the pin under the effect of an excessive couple.

7 Claims, 7 Drawing Figures

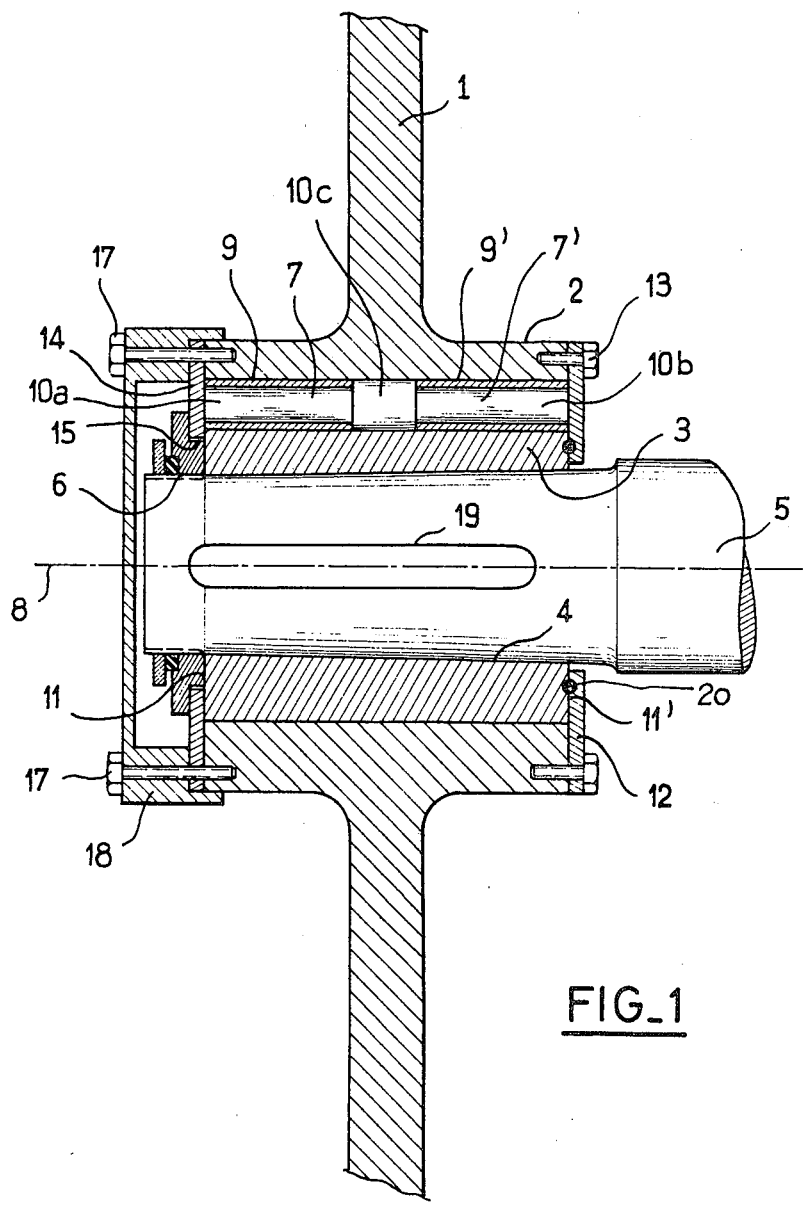
FIG_1

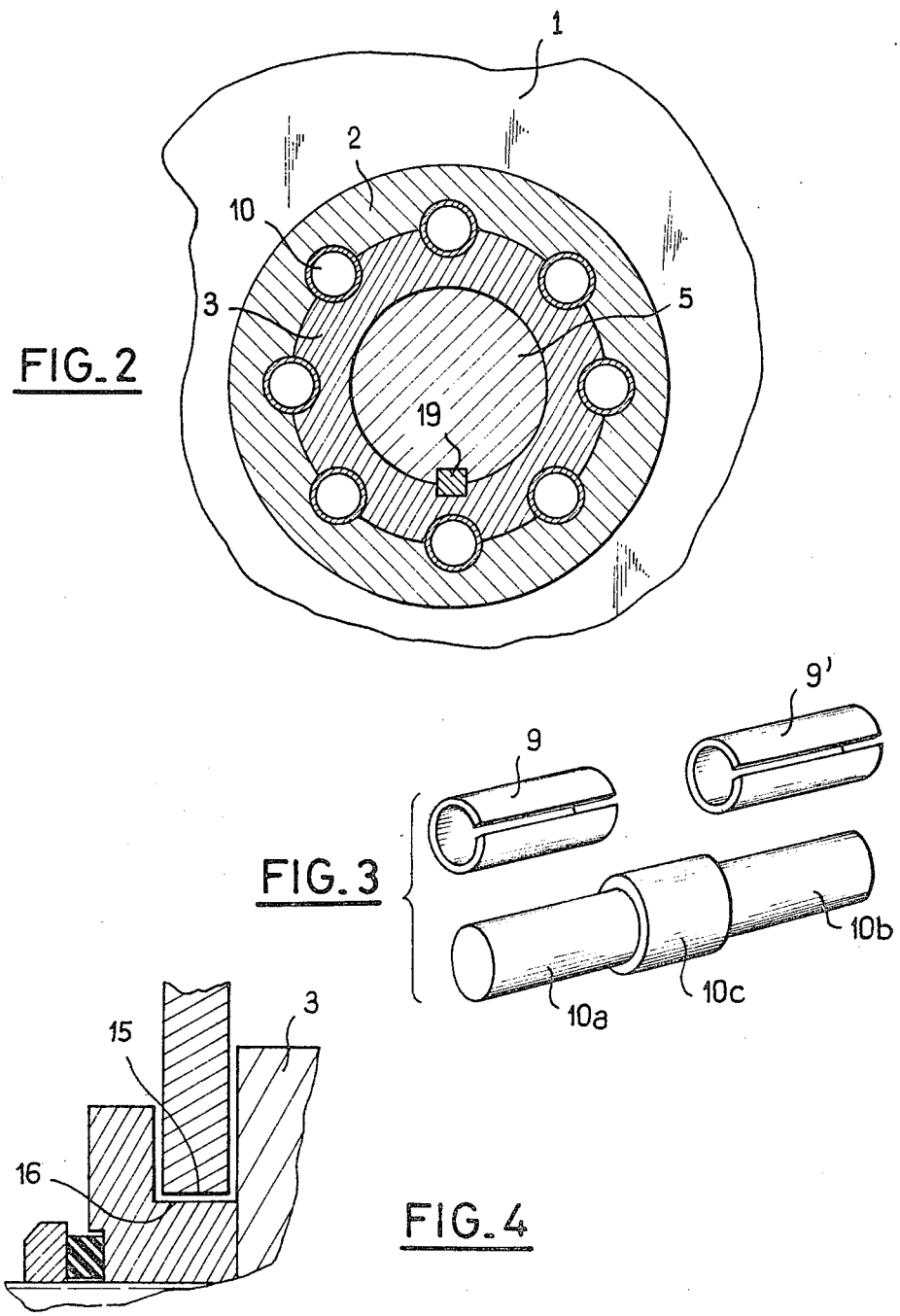

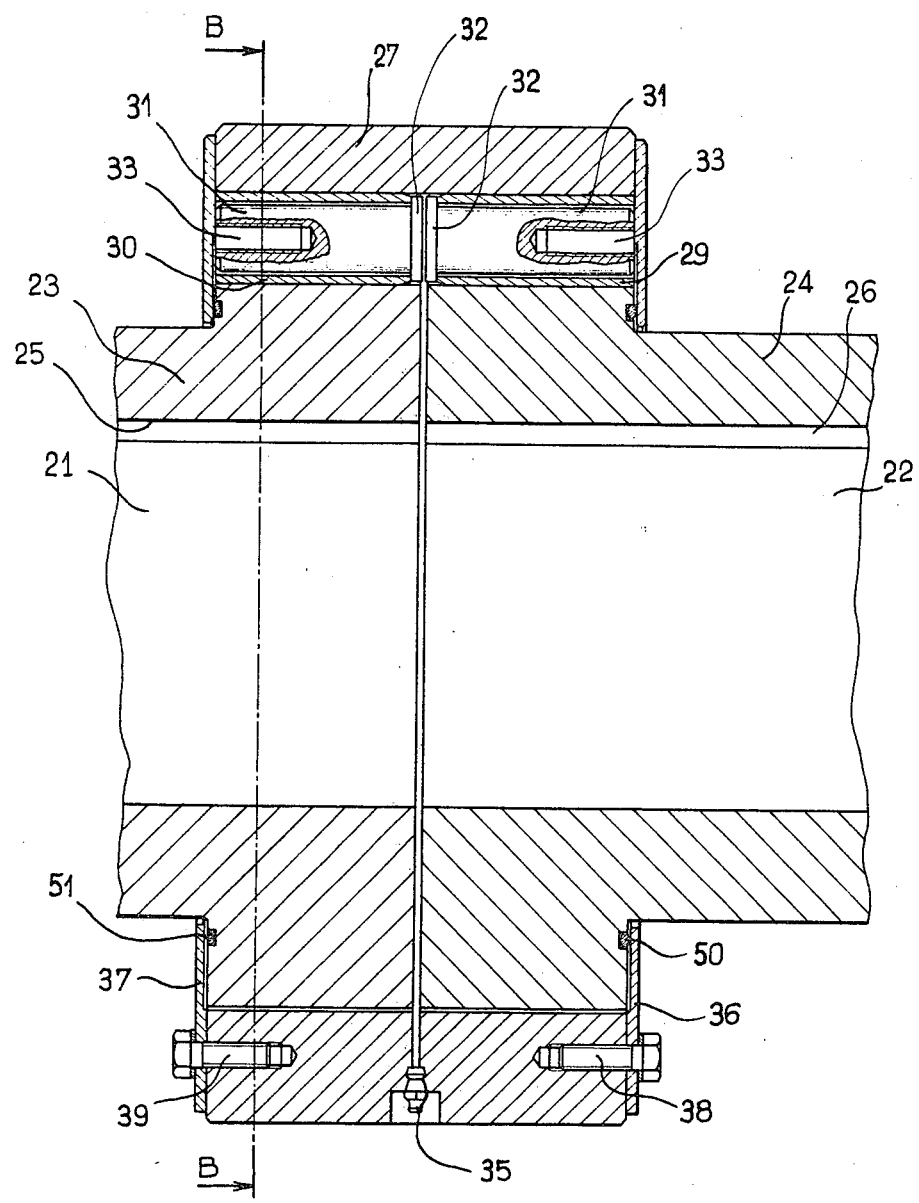
FIG_5

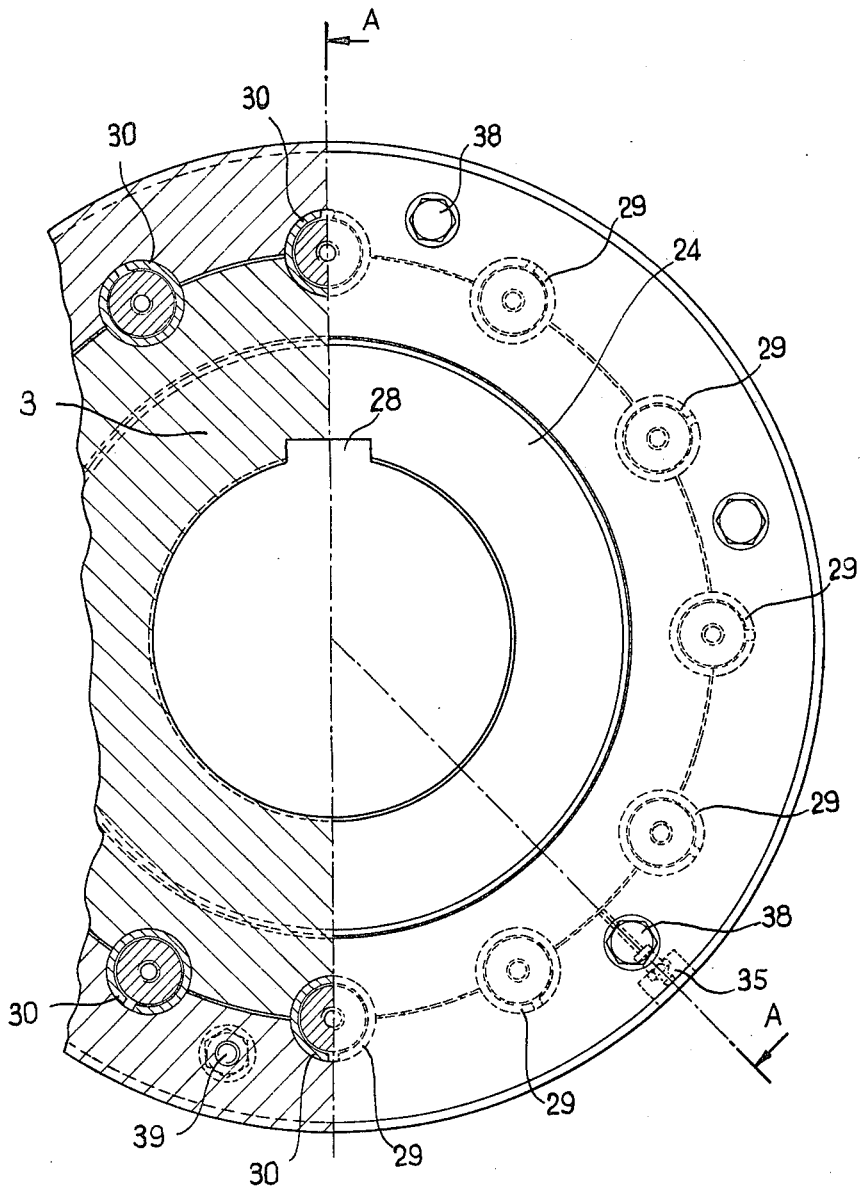
FIG_6

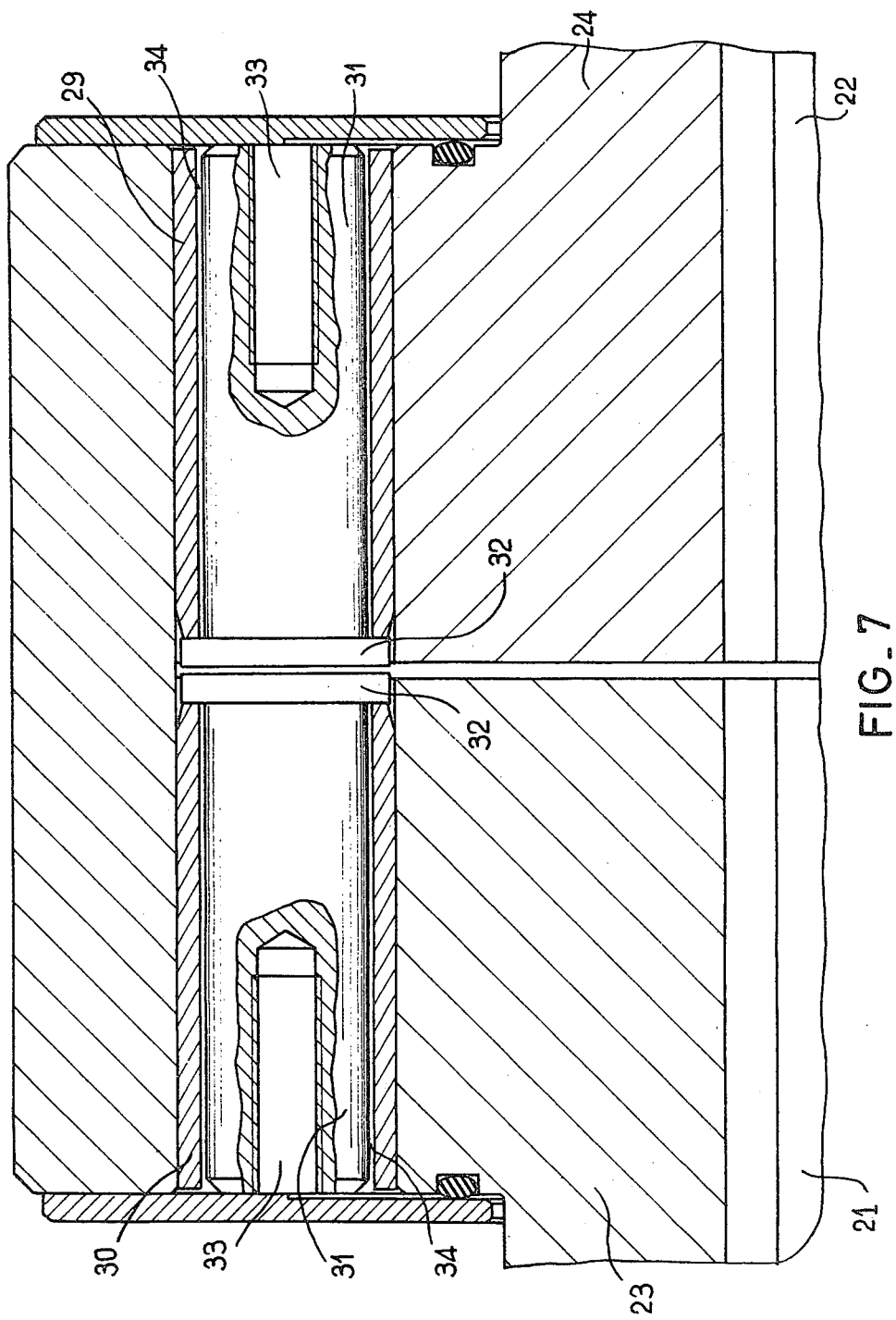
FIG_7

DEVICE FOR COUPLING IN ELASTIC FASHION TWO ROTATING COAXIAL PIECES, RESPECTIVELY INTERIOR AND EXTERIOR, HAVING A CYLINDRICAL INTERFACE

FIELD OF THE INVENTION

The present invention relates to a device for coupling in elastic fashion two coaxial rotating pieces, respectively interior and exterior, having a cylindrical interface.

The interior piece is for example a coupling shaft and the exterior piece is for example the boss of a pulley or of a flywheel. In a variation, the interior piece is double (for example two separated shafts placed end to end) and the exterior piece is a common piece intended to couple the two interior pieces. These two applications are only non limiting examples.

BACKGROUND OF THE INVENTION

It is known to couple in elastic fashion an interior rotating piece and an external coaxial piece having a cylindrical interface, by means of split pins which are introduced into seatings parallel to the rotation axis, which are formed at the interface of the two pieces.

By a seating formed at the interface of the two pieces is meant a seating partly formed in one of the pieces and partly formed in the other piece.

Examples of couplings of this kind are described for example in the following Patents:
French Pat. Nos. 86,913, 1,351,275, 769,403, 786,623, 1,118,286, 2,018,101, 2,170,350.
U.S. Pat. Nos. 1,824,648, 1,467,185.
British Pat. No. 850247.

SUMMARY OF THE INVENTION

The present invention aims to provide an improved device, which is remarkably simple and is suitable notably for coupling pieces of large diameter, and such that the tightness of the coupling varies in inverse relation to the transmitted couple, which adds to the elasticity of the system an unusual resistance to resonance phenomena which can result from the variations of the transmitted couple.

According to the invention, there is provided a device for interlocking in elastic fashion two coaxial rotating pieces, respectively interior and exterior, having a cylindrical interface, which comprises split pins which are introduced into seatings formed parallel to the rotation axis at the interface of the two pieces, wherein the pins are hollow steel cylinders split in the longitudinal direction, each pin being free to rotate in its seating and containing a cylindrical shank threaded in the pin with a predetermined clearance to impose a limit value chosen having regard to the reduction of the width of the split of the pin under the effect of an excessive couple.

When the coupling is in action, the width of the split of a pin decreases and takes a value which depends on the magnitude of the couple which is exerted. For example, this width varies from 9 mm while at rest to 6 mm for a normal working couple. By the effect of a momentary excessive couple, this width could become zero and could render the pin useless besides giving rise to various other risks. The shank limits the decrease of the width of the split while preventing any decrease beyond the value which corresponds to a contact of the pin on the shank; for example the shank may limit the reduction of the width of the split to 3 mm. Under these conditions, when the excessive couple disappears, the pin can take up its normal function again.

BRIEF DESCRIPTION OF THE DRAWINGS

FIG. 1 is an axial section of the coupling of a driving shaft and of the boss of a crusher pulley.

FIG. 2 is a section of the boss in a plane perpendicular to the axis.

FIG. 3 is a detailed view of the boss pins;

FIG. 4 is a partial axial section of the boss at the other end of the shaft;

FIG. 5 is an axial section of the coupling of two coaxial shafts taken in the plane A—A of FIG. 6;

FIG. 6 is a cross-section of the coupling taken in the plane B—B of FIG. 5; and

FIG. 7 is an axial section of two pins threaded on the shafts with a clearance.

DETAILED DESCRIPTION OF PREFERRED EMBODIMENTS

In the embodiment of FIGS. 1 to 4, the invention applies to the elastic coupling between a boss and a shaft, this boss being, for example, the boss of a driving pulley ensuring the functioning of a crusher.

The driving pulley of a crusher transmits to its shaft instantaneous constraints which constitute risks of breaking, which can lead to the necessity of changing the shaft with, as another consequence, the interruption of the functioning of the crusher for a certain period of time.

The present invention produces an elastic coupling decreasing the instantaneous strains on the shaft and consequently avoiding the rupture of the latter by decreasing the stress on the metal of the shaft.

FIGS. 1 and 2 show the boss 2 ("exterior piece") of the pulley 1.

A ring 3 slipped into the boss defines a boring 4 which receives the coupling shaft 5. The ring is attached to the shaft and constitutes with it the "interior piece" of the coupling.

In this embodiment, the ring has a cylindrical external surface and an interior surface in the form of a truncated cone. The assemblage between shaft and pulley for a boring with a large diameter is in fact preferably made on a conical boring in order to facilitate dismounting.

At its end with the smallest diameter, the interior surface connects to an end cylindrical surface 6. These shapes are not restricting and, for example, the interior surface can equally be cylindrical.

At the cylindrical interface of the ring 3 and of the boss 2, a plurality of seatings 7 are formed which are parallel to the axis 8 of the boss and are regularly distributed over the interface.

In these seatings, pins 9, for example "MECANINDUS" pins, are introduced which are constituted of hollow steel cylinders split in the longitudinal direction which can be seen most clearly in FIG. 3.

These pins are threaded with a clearance on the shanks 10, preferably steel shanks, which contribute towards ensuring the service life of the pins. In the illustrated embodiment, the pins are divided into two sets, some pins 9 being introduced into seatings 7 passing out onto a surface 11 of the boss and other pins 9' being introduced into seatings 7' passing out onto the opposite surface 11' of the boss. The pins 9 and 9' are arranged as opposed pairs of pins and the two pins of each pair are carried by the same shank 10. In actual fact, each shank 10 has two cylindrical sections 10a and 10b which are separated by a thicker central part 10c.

The clearance between the shanks 10 and split pins is selected in order to obtain a pre-determined maximum amplitude of the working slide between the ring and the boss. The function of the central thickening 10c is notably to act as a bracing.

The pins are kept in place (in the axial direction) by any appropriate means which allows them to be taken out when required.

In the preferred embodiment which is shown, the pins 9' are retained by a bracket 12 in the form of a disc which is attached by screws 13 to the boss and the pins 9 are retained by a bracket 14 likewise in the form of a disc of which the interior edge 15 is bedded (FIG. 4) in a groove 16 formed in the ring 3. On the other hand, screws 17 attach the disc 14 to the boss 2 and at the same time are used to retain a hood 18 which protects the extremity of the shaft and the corresponding zone of the boss.

The bracket 14 which is bedded in the groove 16 formed in the ring 3 is used among other things in positioning the boss axially and irreversibly with respect to the ring 3. The bracket 12 has a groove for receiving a sealing ring 20 and this bracket co-operates with the hood 18 in constituting a casing which is suitable for containing a lubricating grease.

The ring 3 is attached to the shaft by any appropriate means and for example by a bolt or key 19.

The device shown in FIGS. 5 to 7, for coupling two shafts 21 and 22 arranged end to end, has two rings 23 and 24 in the borings 25 and 26 of which the ends of the two shafts are received, these two rings being arranged face to face in the interior of a common casing 27.

The shafts are interlocked in rotation with the respective rings by bolts or any other appropriate means which have not been shown in FIG. 5. In FIG. 6, the seating 28 of one of the bolts is shown.

The shaft and the ring which is attached to it constitutes an "interior piece".

These interior pieces are interlocked in elastic fashion with a common exterior casing ("exterior piece") by steel pins 29,30 which are split in the longitudinal direction (MECANINDUS pins for example), threaded on the respective shanks 31 which have a pre-determined clearance 34 inside the pins (FIG. 7). The seatings of the pins of a ring are parallel to the axis of the ring.

In proportion to the transmitted couple increasing, the clearance decreases up to the point of becoming zero when this reaches excessive values. The tightness of the coupling then increases very quickly in order to reach values which are equivalent to those of a coupling with rigid cogs.

This arrangement ensures that the elastic limits of the pins are never exceeded and allows the fundamental tightness characteristics of the coupling to be recovered as soon as the abnormal increase of the transmitted couple has stopped.

At their rear end, these shanks are supplied with heads 32 (FIG. 7) which allow the pins to be driven out when the shanks are extracted by pulling them with a grip situated at their front end, for example by pulling them by means of an extractor screwed into a threaded boring 33 which is made in the front end of the shanks.

A lubricator 35 allows the lubrication of the coupling, and brackets 36,37 attached to the box by screws 38,39 and co-operating with O seals 50,51 hinder, in a way known per se, the exit of the lubricant.

The coupling is useful for the coupling of all machine shafts and engine shafts which are fixed or mobile.

The invention relates equally to the production and the sale of an assembly constituted by a pin and the corresponding shank, with a predetermined clearance for the production of a coupling according to the invention.

What is claimed is:

1. A device for interlocking in elastic fashion two coaxial rotating pieces, respectively interior and exterior, having a cylindrical interface, comprising: split pins which are introduced into seatings formed parallel to the rotation axis at the interface of the two pieces, wherein the pins are hollow steel cylinders split in the longitudinal direction, each pin being free to rotate in its seating and containing cylindrical shank means disposed within the pin with a predetermined clearance between the shank means and the pin to impose a limit on the reduction of the width of the split of the pin under the effect of an excessive couple.

2. A device according to claim 1, wherein the seatings respectively extend to the two opposite sides of the exterior piece.

3. A device according to claim 2, wherein the seatings are arranged in aligned pairs and the two seatings of the same pair are crossed by said shank means which has two end sections on which are disposed the two pins, these two sections being separated by a central thickening.

4. A device according to claim 1, further comprising a bracket attached to the exterior piece for axially retaining certain pins.

5. A device according to claim 1, further comprising a disc of which the interior edge is received in a groove formed in the interior piece for axially retaining the pins.

6. A device according to claim 1, wherein a second interior piece is located opposite the first mentioned interior piece, the two interior pieces both being interconnected each with the same exterior piece.

7. A device according to claim 6, wherein the shanks have an extraction grip at one end and at the opposite end have a head which allows the pins to be driven out when the shanks are extracted.

* * * * *